(12) United States Patent
Chen et al.

(10) Patent No.: US 8,398,897 B2
(45) Date of Patent: Mar. 19, 2013

(54) THERMOELECTRIC MATERIAL WITH LOW ELECTRICAL RESISTIVITY AND MANUFACTURE THEREOF

(75) Inventors: Sinn-Wen Chen, Hsinchu (TW); Sin-Jie Wu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 113 days.

(21) Appl. No.: 13/078,615

(22) Filed: Apr. 1, 2011

(65) Prior Publication Data

US 2012/0119164 A1 May 17, 2012

(30) Foreign Application Priority Data

Nov. 17, 2010 (TW) ............................... 99139575 A (51) Int. Cl.
*H01B 1/02* (2006.01)
*H01L 35/16* (2006.01)

(52) U.S. Cl. ................................. 252/519.4; 252/62.3 T (58) Field of Classification Search ............... 252/519.4, 252/520.3, 62.3 T
See application file for complete search history.

(56) References Cited

U.S. PATENT DOCUMENTS

| | | | | |
|---|---|---|---|---|
| 3,762,960 A | * | 10/1973 | Skrabek et al. | 148/538 |
| 3,945,855 A | * | 3/1976 | Skrabek et al. | 136/238 |
| 4,447,277 A | * | 5/1984 | Jayadev et al. | 148/400 |
| 2009/0235969 A1 | * | 9/2009 | Heremans et al. | 136/236.1 |

OTHER PUBLICATIONS

Su et al "HPHT synthesis and electrical properties of AgSbTe2-Ag2Te thermoelectric alloys", Materials Lett. 62(2008) 3269-71.*
Ping et al Thermoelectric properties of (AgSbTe2)100-x(GeTe)x fabricated by hot pressing method, Acta Phys. Sin. 61(8) 2012, pp. 087202-1 to 087202-6.*
Kohri et al "Effect of Microstructure and composition on thermoelectric properties of Te rich Sb2Te3", IEEE 1998, 17th Inter. Conf. on Thermoelectrics.*
Xiaohua Ji et al., "Improved thermoelectric performance in polycrystalline p-type Bi2Te3 via an alkali metal salt hydrothermal nanocoating treatment approach", Journal of Applied Physics, 2008, p. 034907-1-034907-6, vol. 104.
Kuei Fang Hsu et al., "Cubic AgPbmSbTe2+m: Bulk Thermoelectric Materials with High Figure of Merit", Science AAAS, 2004, p. 818-821, vol. 303.
S H Yang et al., "Nanostructures in high-performance (GeTe)x(AgSbTe2)100-x thermoelectric materials", Nanotechnology, 2008, p. 1-5, vol. 19.
Taichao Su et al., "HPHT synthesis and electrical properties of AgSbTe2-Ag2Te thermoelectric alloys", Material Letters, 2008, p. 3269-3271, vol. 62.
V. Jovovic et al., "Measurements of the energy band gap and valence band structure of AgSbTe2", Physical Review B, 2008, p. 245204-1-245204-8, vol. 77.

* cited by examiner

*Primary Examiner* — Mark Kopec
(74) *Attorney, Agent, or Firm* — WPAT, P.C.; Anthony King (57) ABSTRACT

Thermoelectric material has attracted more attentions as a promising energy material in recent years. Research nowadays are devoted to improvement of figure-of-merit ($zT=S^2T/\rho\kappa$). Motivated by p-type $AgSbTe_2$ compound, ternary Ag—Sb—Te has been reported as an important thermoelectric system. Although ternary $AgSbTe_2$ compound has been considered as a candidate for thermoelectric materials with the advantages of low thermal conductivity ($\kappa_p$=0.6 $WK^{-1}$ $m^{-1}$), the relatively high electrical resistivity ($\rho$=7.5*$10^{-3}$ $\Omega cm$) has limited its applications. This invention disclosed brand-new Ag—Sb—Te bulk materials with very fine microstructures that nanoscale $Ag_2Te$ phase precipitate uniformly in the multi-phase matrix through class I reaction, liquid=$Ag_2Te+AgSbTe_2+\delta$. Moreover, the electrical resistivity ($\rho$) measured by four-probe method is as low as 8.4*$10^{-4}$ ($\Omega cm$) at room temperature, which guarantees the promise of those ternary bulk materials.

10 Claims, 11 Drawing Sheets

THERMOELECTRIC MATERIAL WITH LOW ELECTRICAL RESISTIVITY AND MANUFACTURE THEREOF

CROSS-REFERENCED TO RELATED APPLICATIONS

This Non-provisional application claims priority under 35 U.S.C. §119(a) on Patent Application No. 099139575 filed on Nov. 17, 2010 Republic of China, the entire contents of which are hereby incorporated by reference.

FIELD OF THE INVENTION

The present invention relates a thermoelectric material with low electrical resistivity in comparison with a conventional metal or semiconductor.

BACKGROUND OF THE INVENTION

The thermoelectric material is a solid material which can convert thermal energy into electrical energy or use electrical energy to move heat. In 1821, Thomas Johann Seebeck found that a circuit made from two dissimilar metals (Cu and Bi), with junctions at different temperatures ($\Delta T$) would generate an electric potential ($\Delta V$), which is defined as Seebeck coefficient ($S=\Delta V/\Delta T$), and used as a principle for the thermoelectric generator and thermocouple. In 1835, Jean Charles Athanase Peltier found that an electrical current would produce heating or cooling at the junction of two dissimilar metals, and this principle was used for thermoelectric cooler. Twenty years later, William Thomson established the base of thermoelectric theory and predicted a third thermoelectric effect, now known as the Thomson effect. In the Thomson effect, heat is absorbed or produced when current flows in a material with a temperature gradient. The heat is proportional to both the electric current and the temperature gradient.

The thermoelectric material has been developed more than one hundred years so far. How to obtain better thermoelectric conversion efficiency was the most important goal for its applicability. Until 1954, Goldsmid and Douglas etc. applied semiconductor materials to thermoelectric coolers and successfully lowered down cooling temperature to 0° C., this huge progress induced a studying heat in 1960. However, for the past 30 years, this field has fallen in a difficult position. Until 1990, various novel materials have been developed so as to inspire studies in this field. Thermoelectric materials often involve the multi-component system, and complex composition and synthesis condition limit its utility. At present, it is a major object to develop novel thermoelectric materials and thermoelectric components.

In thermoelectric material developments, thermoelectric figure of merit ($z=S^2/\kappa\rho$; S: Seebeck coefficient; $\kappa$=thermal conductivity, $\rho$=electrical resistivity) is an important indicator for developments. Nowadays the most popular commercial thermoelectric material is p-type semiconductor $Bi_2Te_3$, whose thermoelectric figure of merit is 1. Hsu etc. (Science, Vol. 303, pp. 818-821, 2004) has published a paper about high-performance thermoelectric material $AgPb_mSbTe_{2+m}$, which indicated that nano structure could help its thermoelectric conversion efficiency and its thermoelectric figure of merit reached 2.2 at 800K. Therefore, how to obtain better thermoelectric conversion efficiency has become a crucial object.

SUMMARY OF THE INVENTION

Ag—Sb—Te is a material system deserved to study. AgSbTe$_2$ is an existed ternary compound and also a p-type semiconductor having low thermal conductivity and high thermoelectric conversion efficiency (thermoelectric figure of merit is approximately 1.4). However, its high resistivity and fragile characteristic significantly influence its applicability.

It is an object of the present invention to provide a thermoelectric material Ag—Sb—Te having low resistivity.

In one aspect of the present invention, thermoelectric material with low electrical resistivity comprising: at least Ag, Sb and Te, in a molar ratio of 1:2.43~3.29:2.18~2.96, wherein the electrical resistivity of the thermoelectric material is less than 0.1 Ωcm at room temperature.

Preferably, Ag, Sb and Te are constituted in a molar ratio of 1:2.55~3.15:2.31~2.83.

Preferably, the average crystal grain size of the thermoelectric material is preferably less than 1000 nm.

Preferably, the average crystal grain size of the thermoelectric material is preferably less than 500 nm.

Preferably, Ag, Sb and Te are constituted in a total weight ratio of 90% or more.

Preferably, the electrical resistivity of the thermoelectric material is preferably less than 0.01 Ωcm at room temperature.

In another aspect of the present invention, manufacture of preparing a thermoelectric material with low electrical resistivity, comprising the steps of: (A) providing a initial material comprising Ag, Sb and Te in a molar ratio of 1:2.43~3.29:2.18~2.96; (B) melting the initial material in vacuum with a temperature of at least 500° C. for a predetermined period; and (C) quenching the initial material for a predetermined period to form the thermoelectric material; wherein the thermoelectric material is less than 0.1 Ωcm at room temperature.

Preferably, the initial material in step (B) is melted for 24 hours.

Preferably, the initial material in step (C) is firstly quenched to 550° C. with a rate of 1° C./min, secondly quenched at this temperature for 120 hours, and finally quenched again by cool water.

Preferably, the initial material in step (C) is rapidly quenched in first, secondly quenched at 650° C. in a furnace for 120 hours, and finally quenched by cool water.

Resistivity of the thermoelectric material of the present invention is $8.4*10^{-4}$ Ωcm measured by four point probe method at room temperature, and it is one-tenth of that in ternary compound AgSbTe$_2$. According to following analysis and material, the phase formation is proved to be AgSbTe$_2$, δ phase (Sb$_2$Te) and 200-400 nm Ag$_2$Te phase. These results prove that it is an ideal thermoelectric material which is suitable to be applied to modules of thermoelectric generators, industry thermal recycling, and combination with other energy materials such as solar cells. As expected, in the future, new energy materials developed by the thermoelectric material with low resistivity of the present invention may play a crucial role in new energy technology developments.

The embodiments of the present invention are further described through below detailed examples and the drawings.

DETAILED DESCRIPTION

A thermoelectric material with low electrical resistivity and manufacture thereof are described with reference to the preferred embodiments below, it is apparent to those skilled in the art that a variety of modifications and changes may be made without departing from the scope of the present invention which is intended to be defined by the appended claims.

DEFINITION

The formula "Ag-40.0 at % Sb-36.0 at % Te" wherein at % represents the atomic percent of each element in that alloy.

The compositional range of Ag-40.0 at % Sb-36.0 at % Te is determined by the liquidus projection constructed by experiments. During the cooling process, melts with nominal compositions located in that compositional range (Ag, Sb and Te in a molar ration of 1:2.43~3.29:2.18~2.96) will pass through the ternary eutectic point (Ag-40.0 at % Sb-36.0 at % Te), and solidify large amount of nano-sized phase.

Figure 11:
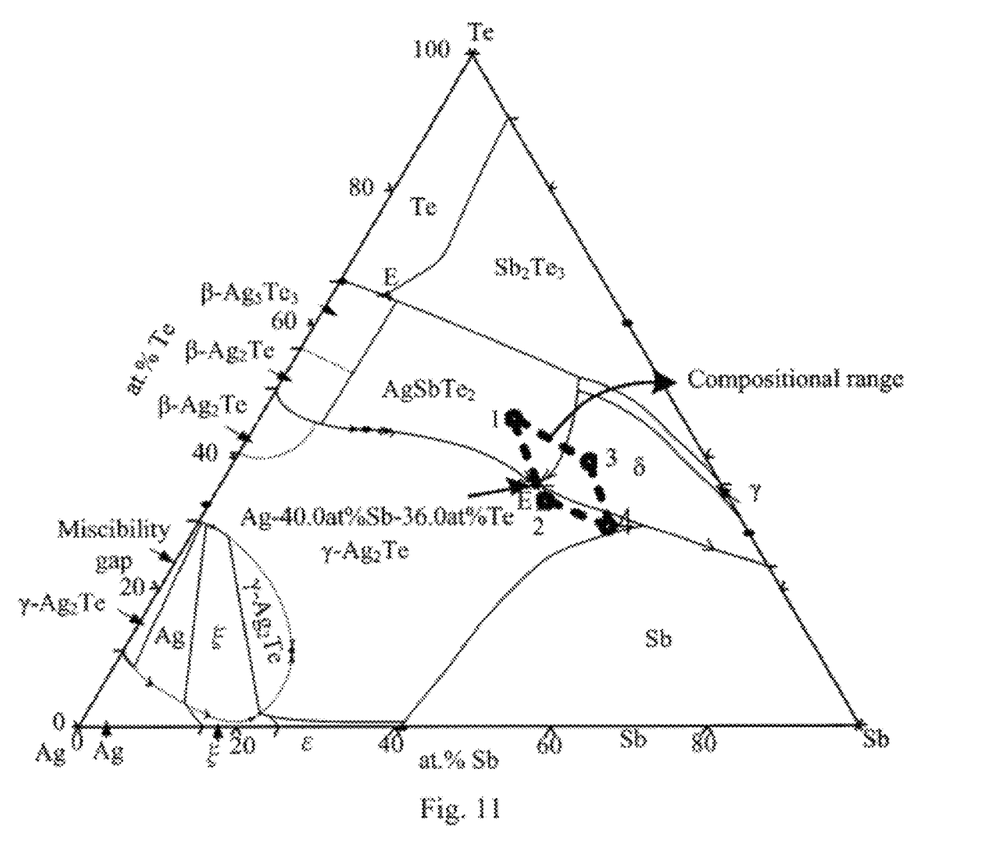
FIG. 11 is a diagram showing a compositional range of the present invention is indicated by a square from points 1 to 4.

The compositional range is indicated by a square. Alloys within that square area will exhibit large amount of the eutectic phase (Ag-40.0 at % Sb-36.0 at % Te) in their solidification microstructures. (as show in FIG. 11) The compositions of points 1, 2, 3 and 4 are: (1) Ag-38.0 at % Sb-47.0 at % Te (Ag:Sb:Te=1:2.43:2.96 in molar ration), (2) Ag-43.3 at % Sb-38.8 at % Te (Ag:Sb:Te=1:2.43:2.18 in molar ration), (3) Ag-45.3 at % Sb-40.8 at % Te (Ag:Sb:Te=1:3.29:2.96 in molar ration), (4) Ag-50.8 at % Sb-33.7 at % Te (Ag:Sb:Te=1:3.29:2.18 in molar ration). The specific compositional range as stated in the claim 1 (Ag, Sb and Te in a molar ratio of 1:2.43~3.29:2.18~2.96) is determined thereby.

Embodiment 1

(i) Metallographic and Composition Analysis

Figure 1:
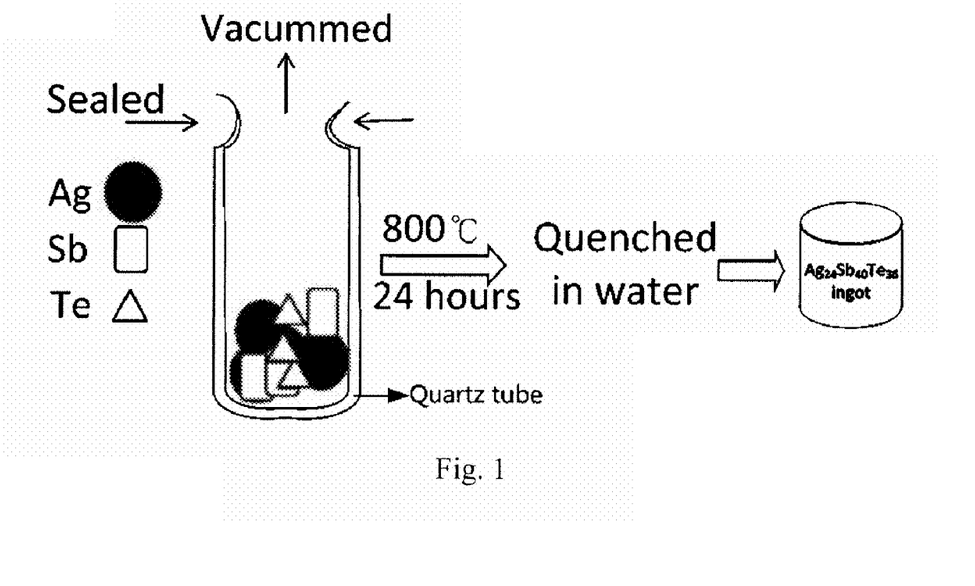
FIG. 1 is a schematic diagram showing the manufacture of the present invention.
Figure 2:
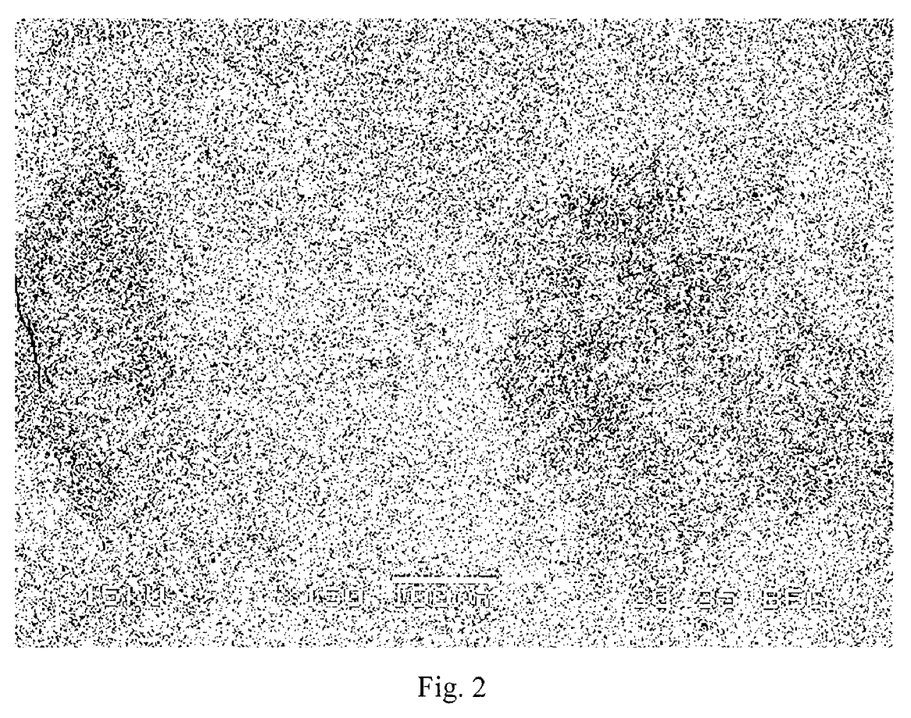
FIG. 2 is a metallographic diagram showing the material of Ag-40.0 at % Sb-36.0 at % Te at low magnification.
Figure 3:
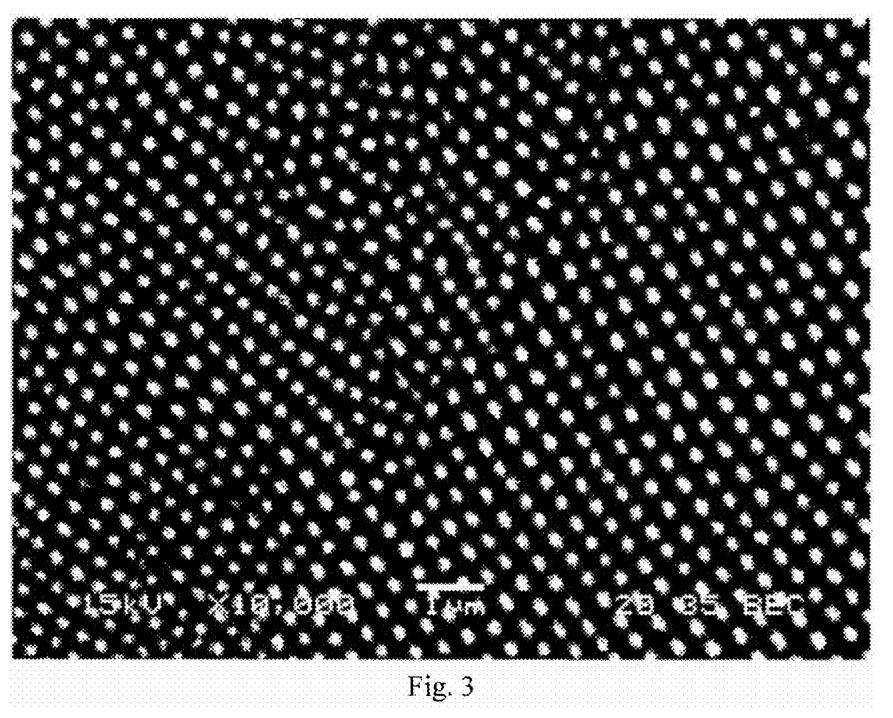
FIG. 3 is a metallographic diagram showing the material of Ag-40.0 at % Sb-36.0 at % Te at high magnification.

With reference to FIG. 1, it demonstrates the manufacture of the present invention. A predetermined amount of silver (Ag), antimony (Sb), and Tellurium (Te) in high purity was weighted by the electronic scale (Mettler, Ae200, USA) to prepare an alloy in a ratio of Ag-40.0 at % Sb-36.0 at % Te, and the prepared alloy was placed in a 6 mm×8 mm quartz tube. In order to prevent oxidation of the alloy, it was sealed by an oxygen-gas torch gun in a vacuum of $2\times10^{-5}$ bar. The alloy was placed in a furnace at 800° C. to melt for 24 hours, and then quenched by cool water to prevent generation of low-temperature solid phase. Then the alloy was cold mount by resin to perform metallographic and composition analysis. The alloy was ground by the sandpapers of #1200, #2400, and #4000, and was polished by aluminum oxide powder of 1.0 μm and 0.3 μm to. Until a mirror surface was shown, residual powder was removed by a sonicator. An optical microscope (OM, Olympus, BH, Japan) was used for initial observation, and then an scanning electronic microscope (SEM, Hitachi, S-2500, Japan) and an electron probe microanalyzer (Electron Probe Microanalysis, EPMA; JEOL, JXA-8600 SX, Japan) were used for the composition analysis. The results were shown in FIGS. 2 and 3, which were metallographic diagrams showing the material of Ag-40.0 at % Sb-36.0 at % Te at different magnification. In FIG. 2, there was no distinguished phase. In FIG. 3, the dotted phase in a grain size of 200-400 nm was uniformly distributed in the alloy, and this nano-size microstructure was a characteristic of the present invention.

(ii) Electrical Property Measurement

Figure 4:
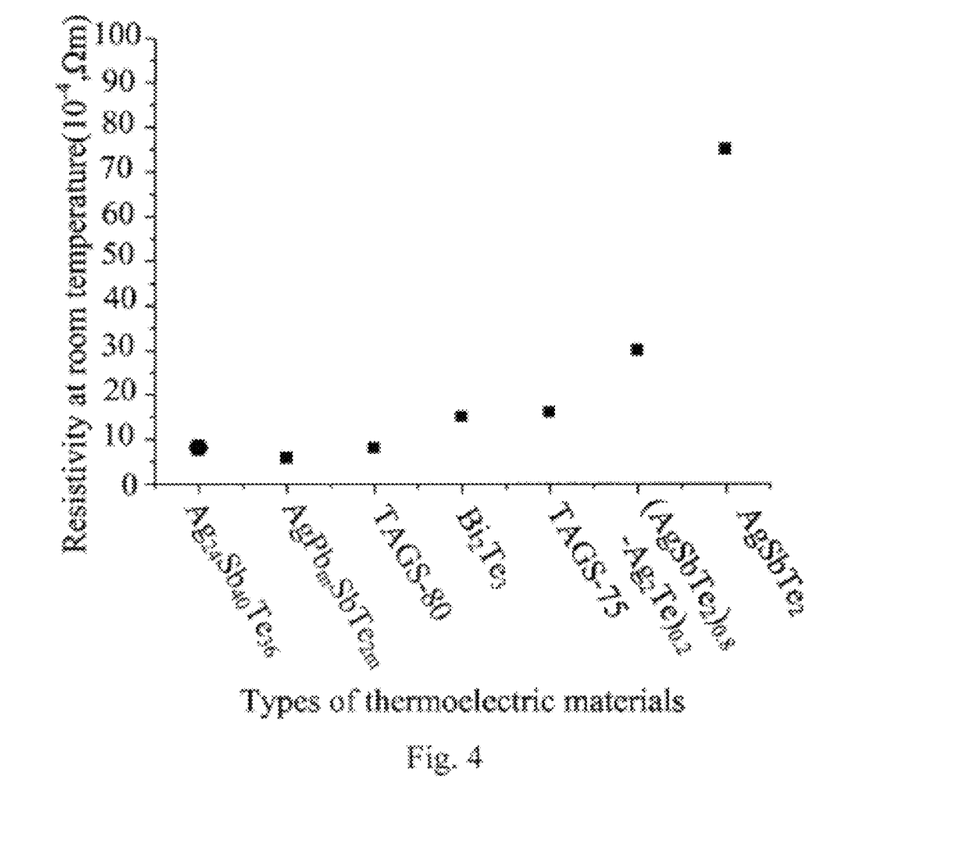
FIG. 4 is a diagram showing electrical resistivities of the material of the present invention in comparison with other high efficiency thermoelectric materials.

The composition and manufacture of the alloy were described as (i), the quenched alloy cylinder was cut by a diamond sawing blade (BUEHLER® IsoMet®, U.S.A) to form a round ingot of 1 mm thickness and 6 mm diameter, and resistivity (Ωcm) of the ingot was then measured by Van der Pauw and four point probe method at room temperature. The 20W Model 2400 SourceMeter® instrument was used, 1 A of input was selected and resistance (Ω) was measured and displayed. By proper calibration and calculation, measured resistivity (ρ) was $7.72*10^{-4}$ (Ωcm). FIG. 4 was a diagram showing electrical resistivity of the material of the present invention in comparison with other high efficiency thermoelectric materials. As compared in FIG. 4, the thermoelectric material of the present invention had an extremely low resistivity.

Embodiment 2

(i) Metallographic and Composition Analysis

Figure 5:
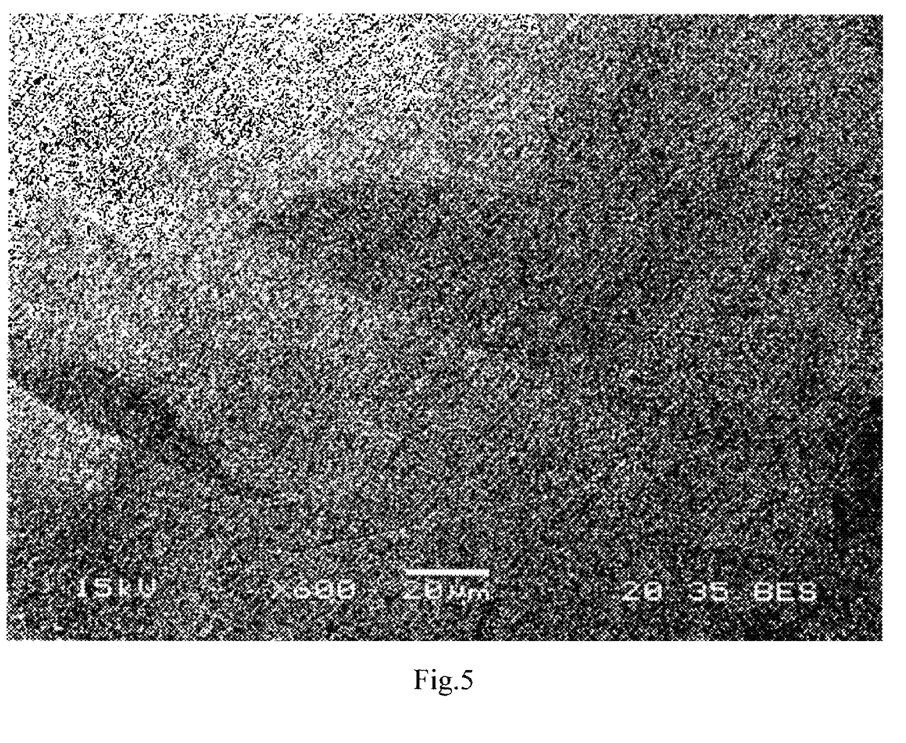
FIG. 5 is a metallographic diagram showing the material of Ag-40.0 at % Sb-36.0 at % Te at low magnification.
Figure 6:
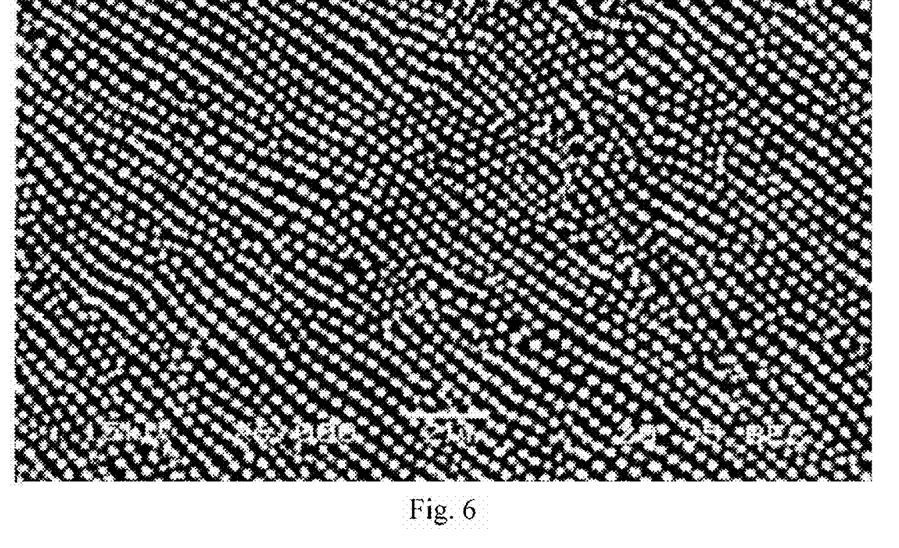
FIG. 6 is a metallographic diagram showing the material of Ag-40.0 at % Sb-36.0 at % Te at high magnification.

In this embodiment, most of the steps are similar with embodiment 1. At first, a predetermined amount of silver (Ag), antimony (Sb), and Tellurium (Te) in high purity was weighted by the electronic scale (Mettler, Ae200, USA) to prepare an alloy in a ratio of Ag-40.0 at % Sb-36.0 at % Te, and the prepared alloy was placed in a 6 mm×8 mm quartz tube. In order to prevent oxidation of the alloy, it was sealed by an oxygen-gas torch gun in a vacuum of $2\times10^{-5}$ bar. The alloy was placed in a furnace at 800° C. to melt for 24 hours, and the alloy was firstly quenched to 550° C. with a rate of 1° C./min, secondly quenched at this temperature for 120 hours, and finally quenched again by cool water. Then the alloy was cold mount by resin to perform metallographic and composition analysis. The following steps were the same as described in embodiment 1 and not repeated herein. The results were shown in FIGS. 5 and 6, which were metallographic diagrams showing the material of Ag-40.0 at % Sb-36.0 at % Te at different magnification. In FIG. 5, there was no distinguished phase. In FIG. 6, the dotted phase in a grain size of 200-400 nm was uniformly distributed in the alloy, and this nano-size microstructure was a characteristic of the present invention.

(ii) Electrical Property Measurement

Figure 7:
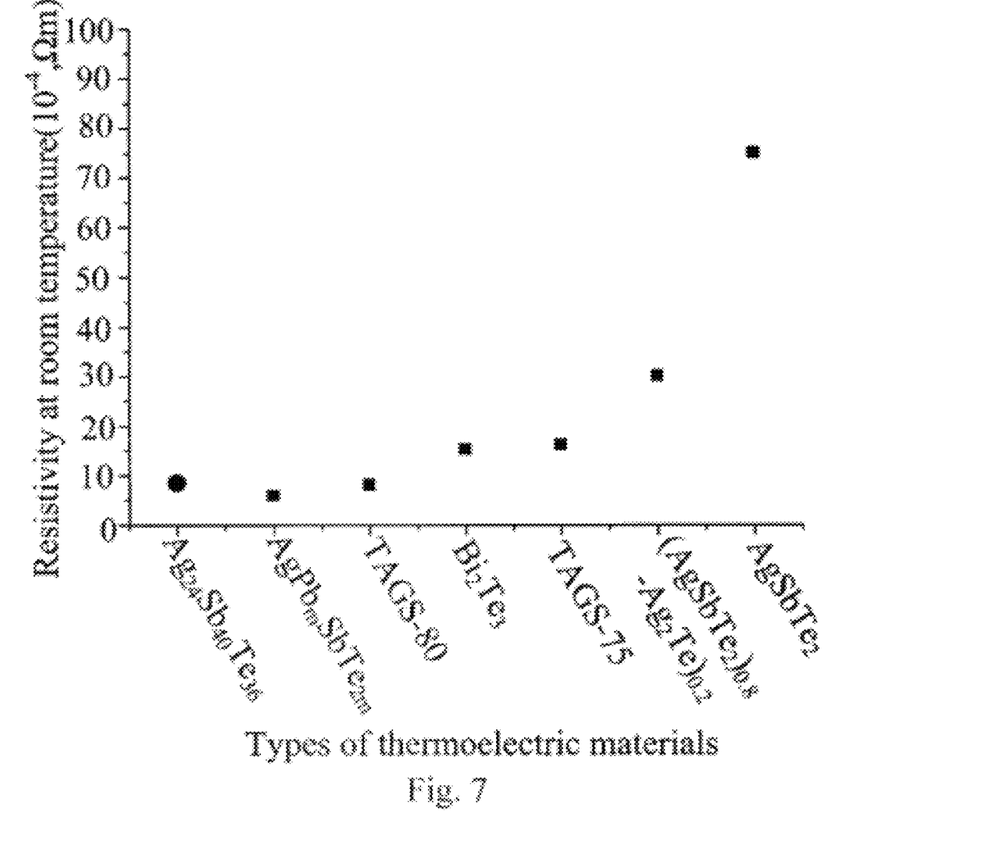
FIG. 7 is a diagram showing electrical resistivities of the material of the present invention in comparison with other high efficiency thermoelectric materials.

The composition and manufacture of the alloy were described as (i), the quenched alloy cylinder was cut by a diamond sawing blade (BUEHLER® IsoMet®, U.S.A) to form a round ingot of 1 mm thickness and 6 mm diameter, and resistivity (Ωcm) of the ingot was then measured by Van der Pauw and four point probe method at room temperature. The 20W Model 2400 SourceMeter® instrument was used, 1 A of input was selected and resistance (Ω) was measured and displayed. By proper calibration and calculation, measured resistivity (ρ) was $8.33*10^{-4}$ (Ωcm). FIG. 7 was a diagram showing electrical resistivity of the material of the present invention in comparison with other high efficiency thermoelectric materials. As compared in FIG. 7, the thermoelectric material of the present invention had an extremely low resistivity.

Embodiment 3

(i) Metallographic and Composition Analysis

Figure 8:
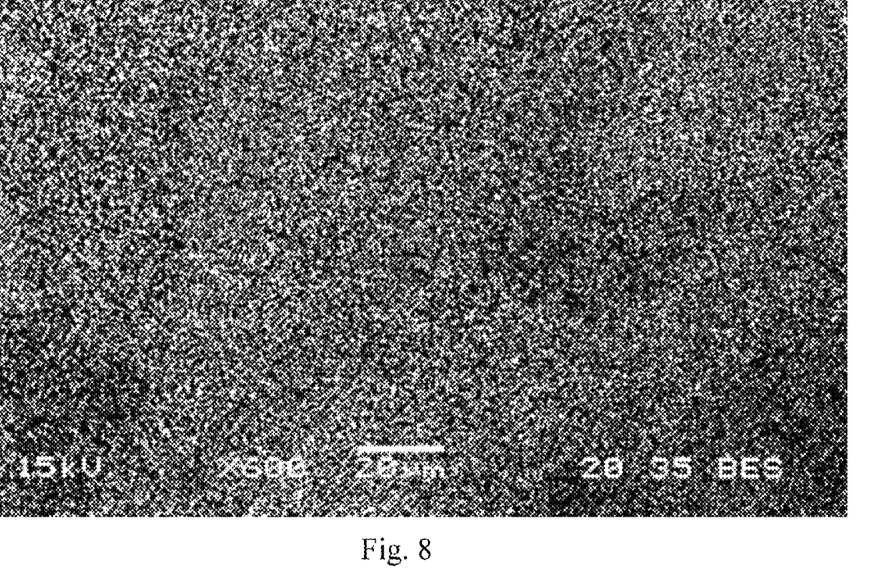
FIG. 8 is a metallographic diagram showing the material of Ag-40.0 at % Sb-36.0 at % Te at low magnification.
Figure 9:
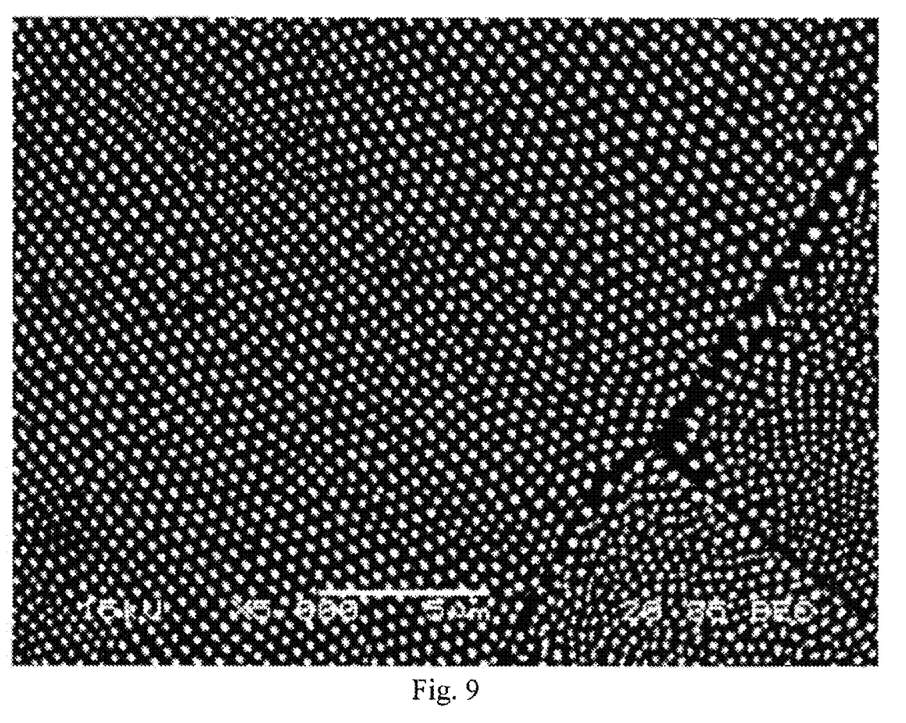
FIG. 9 is a metallographic diagram showing the material of Ag-40.0 at % Sb-36.0 at % Te at high magnification.

In this embodiment, most of the steps are similar with embodiment 1. At first, a predetermined amount of silver (Ag), antimony (Sb), and Tellurium (Te) in high purity was weighted by the electronic scale (Mettler, Ae200, USA) to prepare an alloy in a ratio of Ag-40.0 at % Sb-36.0 at % Te, and the prepared alloy was placed in a 6 mm×8 mm quartz tube. In order to prevent oxidation of the alloy, it was sealed by an oxygen-gas torch gun in a vacuum of $2\times10^{-5}$ bar. The alloy was placed in a furnace at 800° C. to melt for 24 hours. After rapid cooling, the alloy was quenched at 650° C. for 120 hours, and then quenched again by cool water. Then the alloy was cold mount by resin to perform metallographic and composition analysis. The following steps were the same as described in embodiment 1 and not repeated herein. The results were shown in FIGS. 8 and 9, which were metallographic diagrams showing the material of Ag-40.0 at % Sb-36.0 at % Te at different magnification. In FIG. 8, there was no distinguished phase. In FIG. 9, the dotted phase in a grain size of 200-400 nm was uniformly distributed in the alloy, and this nano-size microstructure was a characteristic of the present invention.

(ii) Electrical Property Measurement

Figure 10:
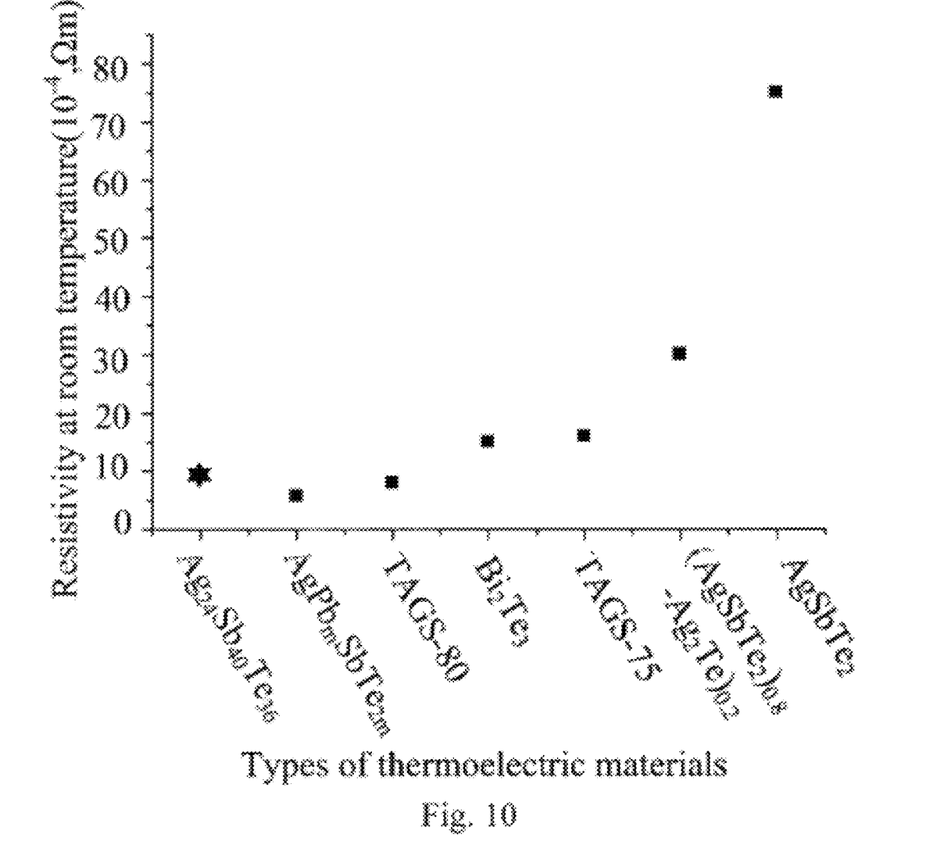
FIG. 10 is a diagram showing electrical resistivities of the material of the present invention in comparison with other high efficiency thermoelectric materials.

The composition and manufacture of the alloy were described as (i), the quenched alloy cylinder was cut by a diamond sawing blade (BUEHLER® IsoMet®, U.S.A) to form a round ingot of 1 mm thickness and 6 mm diameter, and resistivity (Ωcm) of the ingot was then measured by Van der Pauw and four point probe method at room temperature. The 20W Model 2400 SourceMeter® instrument was used, 1 A of input was selected and resistance (Ω) was measured and displayed. By proper calibration and calculation, measured resistivity (ρ) was $9.33*10^{-4}$ (Ωcm). FIG. 10 was a diagram showing electrical resistivity of the material of the present invention in comparison with other high efficiency thermoelectric materials. As compared in FIG. 10, the thermoelectric material of the present invention had an extremely low resistivity.

As depicted in the above embodiments, the thermoelectric material of the present invention had a uniformly nano-size microstructure, and its average resistivity was about $8.46*10^{-4}$ Ωcm. Other high efficiency thermoelectric materials in the previous documents were listed in table. 1. According to table. 1, resistivity of the thermoelectric material of the present invention was lower than those in other thermoelectric materials, such as $Bi_2Te_3$, $AgSbTe_2$, $(AgSbTe_2)_{0.8}(Ag_2Te)_{0.2}$ and TAGS-75, which proved it was a ideal thermoelectric material.

TABLE 1

Average resistivity of the thermomaterial of the present invention in comparison with those in other materials in previous documents.

| | ρ(Ωcm) at room temperature | Reference |
|---|---|---|
| Ag - 40.0 at % Sb - 36.0 at % Te | $8.4 \times 10^{-4}$ | the persent invention |
| $Bi_2Te_3$ | $1.5 \times 10^{-3}$ | Ji et al., J. Appl. Phys., Vol. 104, p. 034907, (2008). |
| $AgSbTe_2$ | $7.5 \times 10^{-3}$ | Jovovic and J. P. Heremans, PHYSICAL REVIEW B, Vol. 77, p.245204, (2008). |
| $AgPb_mSbTe_{2m}$ | $5.7 \times 10^{-4}$ | K. F. Hsu et al., Science, Vol. 303, p.818, (2004). |
| $(AgSbTe_2)_{0.8}(Ag_2Te)_{0.2}$ | $3.0 \times 10^{-3}$ | T. Su et al., Materials Letters, Vol. 62, p. 3269, (2008). |
| TAGS-75 | $1.6 \times 10^{-3}$ | S. H. Yang et al., Nanotechnology, Vol. 19, p. 245707, (2008). |
| TAGS-80 | $8.0 \times 10^{-4}$ | |

New energy material belongs to one of the top five development fields. To correspond flourish developments in energy industry, the present invention provides a thermoelectric material which has low resistivity and uniform nano size microstructure, and it can be produced by a simple manufacture. The present invention clearly discloses the embodiments of thermoelectric material, which can be applied to modules of thermoelectric generators, industry thermal recycling, and combination with other energy materials such as solar cells. Therefore, the present invention meets the requirement of utility. The thermoelectric material and its manufacture of the present invention can be used as a critical material required in developments of new energy materials. Further, there was no application about Ag—Sb—Te thermoelectric material with low resistivity and uniform nano size microstructure in the past. Therefore, the present invention also meets the requirements of novelty and unobvious.

According to the report of BBC Research & Consulting company, the market of new energy equipment and materials in 2009 is estimated as 116 hundred million dollars, and it is expected to increase to 116 hundred million dollars until 2014. Compound Annual Growth Rate (CAGR) has reached 7.8% in the resent five years, and the photothermal material possesses the highest ratio. Its market cost 83 hundred million dollars in 2009, and its CAGR reached 9.8%. Therefore, the invention can meet the requirement of this growing market.

Although the present invention is described with reference to the preferred embodiments thereof, it is apparent to those skilled in the art that a variety of modifications and changes may be made without departing from the scope of the present invention which is intended to be defined by the appended claims.

What is claimed is:

1. A thermoelectric material with low electrical resistivity, comprising Ag, Sb and Te in a molar ratio of 1:2.43~3.29: 2.18~2.96, wherein the electrical resistivity of the thermoelectric material is less than 0.1 Ωcm at room temperature.

2. The thermoelectric material as claimed in claim 1, wherein Ag, Sb and Te are constituted in a molar ratio of 1:2.55~3.15:2.31~2.83.

3. The thermoelectric material as claimed in claim 1, wherein the average crystal grain size of the thermoelectric material is less than 1000 nm.

4. The thermoelectric material as claimed in claim 1, wherein the average crystal grain size of the thermoelectric material is less than 500 nm.

5. The thermoelectric material as claimed in claim 1, wherein Ag, Sb and Te are constituted in a total weight ratio of 90% or more.

6. The thermoelectric material as claimed in claim 1, wherein the electrical resistivity of the thermoelectric material is less than 0.01 Ωcm at room temperature.

7. A thermoelectric material with low electrical resistivity made by the steps of:
   (A) providing a initial material comprising Ag, Sb and Te in a molar ratio of 1:2.43~3.29:2.18~2.96;
   (B) melting the initial material in vacuum with a temperature of at least 500° C. for a predetermined period; and
   (C) quenching the initial material for a predetermined period to form the thermoelectric material;
   wherein the thermoelectric material is less than 0.1 Ωcm at room temperature.

8. The manufacture as claimed in claim 7, wherein the initial material in step (B) is melted for 24 hours.

9. The manufacture as claimed in claim 7, wherein the initial material in step (C) is firstly quenched to 550° C. with a rate of 1° C./min, secondly quenched at this temperature for 120 hours, and finally quenched again by cool water.

10. The manufacture as claimed in claim 7, wherein the initial material in step (C) is rapidly quenched in first, secondly quenched at 650° C. in a furnace for 120 hours, and finally quenched by cool water.

* * * * *